Nov. 15, 1932.  J. WHYTE  1,887,532
VEHICLE BRAKING SYSTEM
Filed Jan. 15, 1931   2 Sheets-Sheet 1
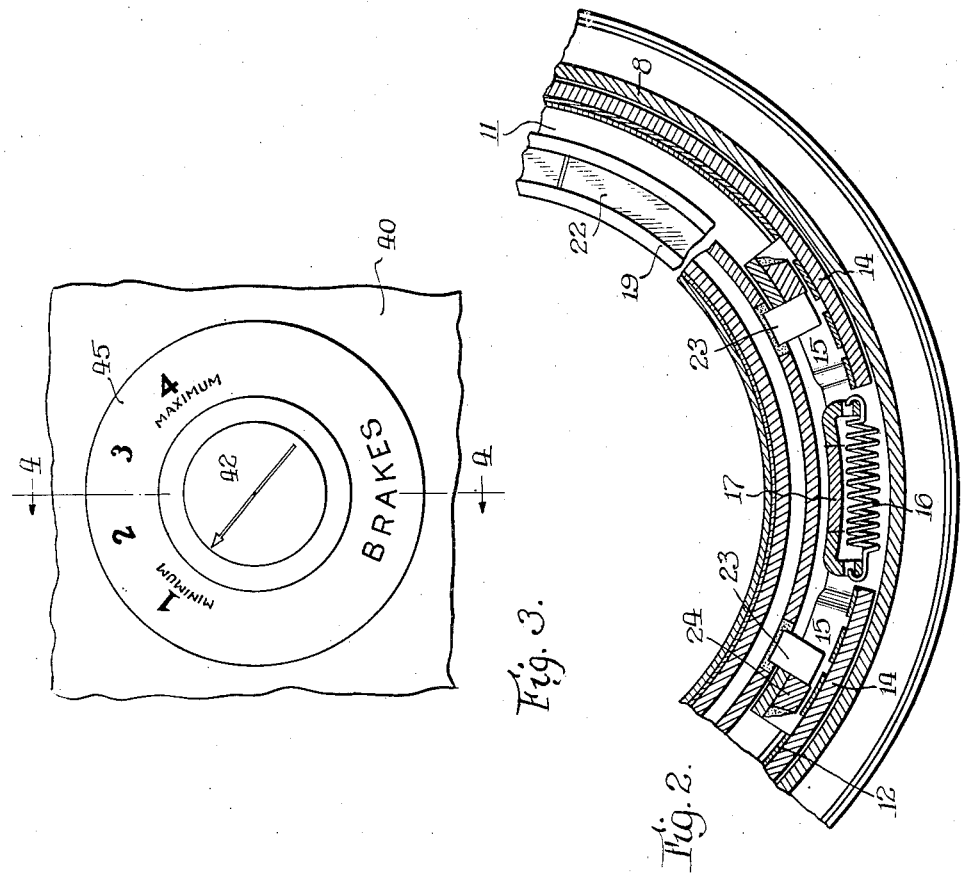

Nov. 15, 1932.  J. WHYTE  1,887,532
VEHICLE BRAKING SYSTEM
Filed Jan. 15, 1931  2 Sheets-Sheet 2
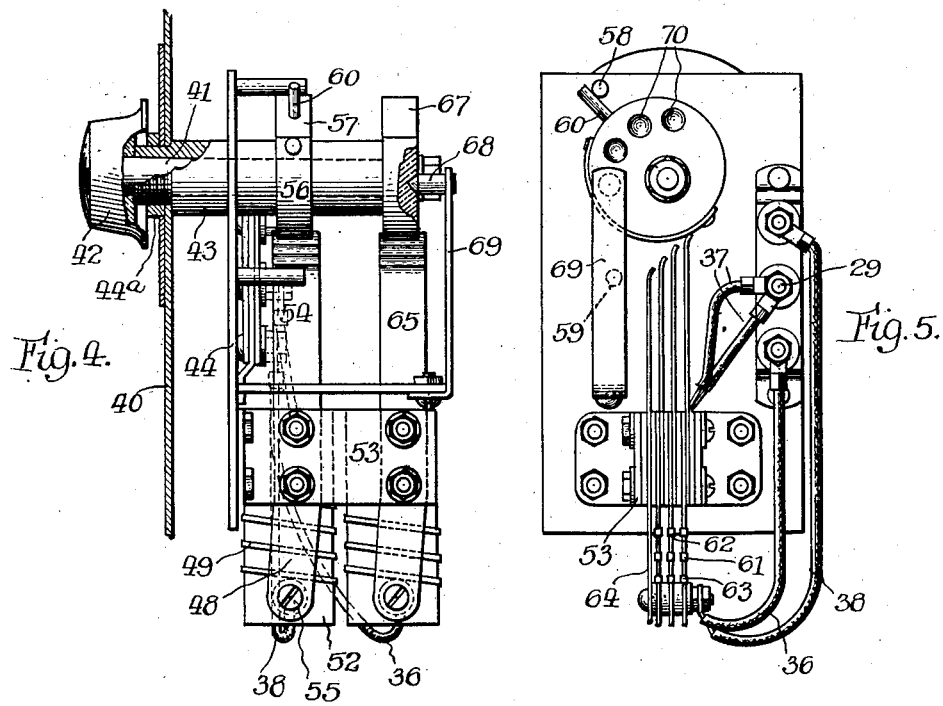
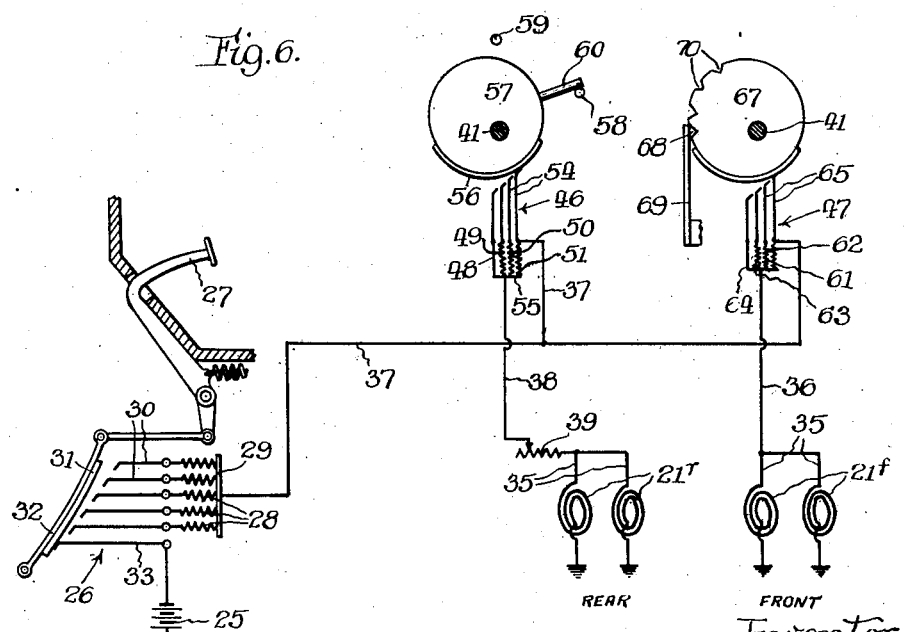

Patented Nov. 15, 1932

1,887,532

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

VEHICLE BRAKING SYSTEM

Application filed January 15, 1931. Serial No. 508,844.

This invention relates to braking systems of automotive vehicles and has more particular reference to the control of such a system to adapt the same to the many different road conditions encountered in the service use of the vehicle.

The maximum retarding effect which a vehicle braking system is capable of exerting obtains when the vehicle wheels are just at the point of locking or skidding and this point varies widely with the different kinds of road surfaces and the degree of dampness thereof. When skidding occurs, the braking efficiency decreases and the safety of operation of the vehicle is thereby impaired.

The primary object of the present invention is to lessen the danger of locking the vehicle wheels by providing an electric braking system having a new and improved auxiliary regulating means by which the driver may conveniently vary in a small number of predetermined steps the range of total braking which can be produced by the system through the actuation of the primary brake controller, thereby enabling the driver to adapt the braking system to the character of the road being traveled.

Because the front wheels of a modern automobile vehicle sustain a greater proportion of the total load during braking, the braking system is usually adjusted to distribute the total braking effect between the front and rear wheels approximately in the ratio of sixty to forty percent. In view of the location of the vehicle's center of gravity nearer the front wheels, there is a greater tendency for the rear end of the vehicle to swerve sidewise in the event that locking of the wheels does occur. It follows therefore that the effectiveness of the braking system may be increased and the tendency of the vehicle to slide sidewise when traveling on slippery road surfaces may be decreased by increasing the proportion of the total retarding action which is exerted at the front wheels.

It is another object of the invention therefore to incorporate in an electric braking system for an automotive vehicle a novel supplemental control device arranged for manipulation by the vehicle driver to vary the ratio in which the total braking effect governed by the primary brake controller is distributed between the front and rear vehicle wheels.

Another object is to incorporate in a four wheel vehicle braking system a single supplemental controller operable in successive steps either to decrease the total braking effect capable of being produced by the primary brake controller and at the same time to increase the proportion of the braking exerted at the front wheels or to increase the total braking effect and decrease the ratio of front to rear wheel braking.

Other objects and advantages of the invention will become apparent from the following detailed description taken in connection with the accompanying drawings, in which Figure 1 is a fragmentary sectional view of a vehicle wheel equipped with an electric brake which is particularly adapted for use with the present system.

Fig. 2 is a fragmentary sectional view taken substantially along the line 2—2 of Fig. 1.

Fig. 3 is a face view of the auxiliary brake control device.

Fig. 4 is a sectional view taken along the line 4—4 of Fig. 3.

Fig. 5 is a rear elevational view of the device shown in Fig. 4.

Fig. 6 is a schematic wiring diagram of the brake control system.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the invention is embodied in a braking system having an individual brake unit such as is shown in Fig. 1 associated with each front and rear wheel 7. Each brake comprises a drum 8 having the usual flange 9 bolted to the inner end of the hub 10 of the wheel. The inwardly opening end of the drum is closed by an annular plate 11 suitably secured to a nonrotatable part of the vehicle chassis.

In the present instance, the nonrotatable friction surface of the brake is of the band type comprising a metal strip 12 encircling an inwardly projecting flange 13 on the anchor plate and carrying segments 14 of friction material. Fittings 15 are secured to the opposite ends of the strip 12 and drawn by a spring 16 into abutting engagement with the opposite end surfaces of a stop 17 rigid with the anchor plate.

Incorporated in each wheel brake is an electrically controlled operator of the so-called momentum type comprising two rings 18 and 19 of magnetic material arranged concentric with the drum and adapted for axial gripping engagement. The ring 18 constitutes a magnetic armature and is floatingly supported on the drum for rotation therewith through the medium of a plurality of annularly arranged and tangentially extending spring arms 20 which act by lateral flexure to maintain the inner friction face of the armature ring constantly in light mechanical contact with the face of the magnet.

The ring 19 constitutes the magnet proper and is U-shaped in cross section with a winding 21 disposed between its two concentric poles which are separated by plates 22 of nonmagnetic material providing a wear resisting surface substantially flush with the end faces of the poles and adapted to sustain the axial pressure between the two magnetic rings.

Projecting rigidly from the outer magnet pole are two actuating lugs 23 having oppositely facing surfaces positioned to abut against lugs 24 which are rigid with the fittings 15. Upon movement of the magnet in either direction away from normal brake-released position (Fig. 2), one or the other of the lugs 23 will move its end of the brake band away from the stop 17, thereby expanding the band against the drum.

Such actuation of the band takes place whenever the winding 21 is energized with the wheel in motion. The magnetic attraction thus produced causes gripping engagement between the friction surfaces of the two rings proportional to the strength of the energizing current, whereupon the magnet ring will be driven frictionally by the armature ring, thereby moving with the wheel a short angular distance. In this movement, one end of the band is moved away from the stop 17 which expands the band, thereby pressing the segments 14 against the drum surface. After the normal clearance has been taken up, angular movement of the magnet ceases causing slippage between the ring surfaces in the continued rotation of the wheel. When the current flow is interrupted, the spring 16 acting through the medium of the actuated fitting 15 and the lug 23 serves to restore the magnet as well as the actuated end of the band to normal position.

The storage battery 25 (Fig. 6) commonly provided on automotive vehicles is utilized as a source of energy current for the brake magnets of the four wheel brakes and the magnitude of the current is controlled by a common rheostat 26 arranged to be actuated by a primary brake controller such as the usual foot pedal 27. In the form shown herein, the rheostat comprises a plurality of parallel resistance elements 28 having a common terminal 29 at one end and connected individually at their other ends to spaced spring strips 30 which are engaged successively by a contactor plate 31 whose curved surface is brought into abutting engagement with the curved ends of the strips by depression of the foot pedal 27. The latter is connected to the free end of a swingable crank arm 32 which carries the contactor plate. An auxiliary strip 33, constantly engaged by the plate 31, is connected to the non-grounded terminal of the battery 25 so that upon engagement of the first strip 30 by the plate, current will be applied to the circuit and further movement of the pedal will cut in additional resistance elements and thereby increase the current.

Preferably, the windings 21 for the different brake magnets are interposed in parallel relation between the grounded battery terminal and the rheostat terminal 29. For this purpose, one of their terminal ends is grounded to their core 19 and the insulated end is joined to a binding terminal 34 which projects through the anchor plate 11 and is connected to a flexible cable conductor 35 supported by the vehicle chassis. In the case of the front wheel brakes, whose magnet coils are indicated as 21$^f$, the cable conductors 35 merges into a conductor 36 which, through a conductor 37, leads to the rheostat terminal 29.

The cables joined to the rear brake windings 21$^r$ are merged into a conductor 38 connected to the conductor 37 and having a variable resistance element 39 interposed therein. By adjusting this element, current in the rear brake coils may be decreased to any desired value below that in the front brakes, thereby enabling standardized magnets of the same number of turns to be used either on the front or the rear wheels of the vehicle. With this arrangement, a greater proportion of total braking effect is exerted by the front wheels in accordance with established automobile practice.

With the electric braking system above described, the retarding effects at the different wheels and therefore the total braking throughout the entire braking range are determined solely by the intensity of the energizing currents in the brake windings, and the maximum braking action for any given current intensity is developed instantly upon closure of the circuits inasmuch as the reluctance of the flux circuit through the magnet rings of each brake is maintained constant at all times by virtue of the fact that the rings are continuously urged into light mechanical contact. In view of the fact that each pair of front and rear brakes may be supplied with current from a common conductor, the ratio in which the total braking action is distributed between the front and rear wheels for all current intensities governed by the foot pedal rheostat, is determined by the relative resistances of the front and rear brake circuits which may be varied as desired.

In accordance with the objects of the present invention, regulating means is provided which may be manipulated conveniently by the vehicle driver to vary, in a comparatively small number of predetermined increments, the total current which flows through the brake magnets for any given position of the foot pedal rheostat. This means, in the embodiment herein shown, is in the form of a supplemental circuit controller normally closing the brake circuits to permit of application and control of the brakes by the main rheostat and adapted to be shifted selectively into different set positions to vary the circuit resistance in proper amounts for adapting the braking system to a plurality of different road conditions.

The supplemental controller is located so as to be within the reach of and visible at all times to the vehicle driver. For this purpose, it may be mounted on the vehicle dash-board or instrument panel 40 with its contact actuating member, which is in the form of a shaft 41, projecting through the panel and carrying a knob 42 by which the shaft may be turned in one direction or the other. In the present form of the controller, the shaft 41 is journaled in a shouldered sleeve 43 which is made rigid with a frame plate 44 by means of a clamping nut 44ª. The knob 42 bears an arrow or other means cooperating with numerals or other designations on a scale 45 to indicate the setting of the controller.

In order that the degree of total braking and the ratio of distribution between the front and rear wheels may be varied by means of the same actuator that varies the total intensity of braking, the circuit controller above referred to is composed of two independent rheostats 46 and 47 respectively controlling the rear and front brake circuits and having their resistance elements so constructed that the ratio between the values of the resistances of the front and rear brake circuits is increased at the same time that the total resistance of the circuits is decreased and vice versa.

Referring now to Figs. 4, 5 and 6, the rheostat 46, controlling the rear brake circuits, includes a metal ribbon 48 and three resistance ribbons 49, 50 and 51 wound around insulating plates 52 which are clamped between L-shaped brackets 53 on the frame plate and support four insulated spring strips 54 in contact with the respective ribbons. The other ends of the ribbons are common to a binding terminal 55 to which the conductor 38 is connected. The conductor 37 is connected to the insulated end of the element 51 so that the latter is permanently included in series with the rear brake magnets.

The strips 54 are of different lengths and their free ends are positioned for abutting engagement with an arcuate metal contact plate 56 secured to the periphery of an insulating disk 57 mounted eccentrically on the shaft 41 and swingable thereby between two limiting positions determined by stops 58 and 59 cooperating with an arm 60. When the control knob 42 is in its No. 1 position, movement of the shaft 41 is limited by the stop 58 as shown in Fig. 6 and only the longest strip 54 is engaged by the plate. The resistance of the rear brake circuits is then a maximum since only the element 51 is interposed therein.

In the movement of the shaft 41 to No. 2 position, the second longest strip is engaged and the resistance element 50 interposed in parallel with the element 51 between the terminal 55 and the conductor 37 thereby decreasing the resistance of the two rear brake circuits with a corresponding increase in the current and therefore in the braking action produced at the rear wheels when the foot pedal 27 is depressed. A third strip is engaged in the movement of the shaft to No. 3 position, the element 49 being thus introduced and effecting a further reduction in the circuit resistance. As the shaft moves to No. 4 position, in which it is limited by the stop 59, the shortest strip 54 is engaged, whereupon the ribbon 48 establishes a short circuit between the conductors 37 and 38 which renders the rheostat 46 ineffective, the intensity of currents in the rear brake magnets being then controlled solely by the main rheostat 26.

The rheostat 47, which controls the current intensity in the front wheel brakes, is constructed the same as the rheostat 46, having a resistance element 61 permanently included in the front brake circuits between the conductors 36 and 37 and two resistance elements 62 and 63 and a short-circuiting element 64 adapted to be thrown into the circuit successively in the movement of the control shaft 41 into its second, third and fourth positions. For this purpose, the insulated ends of the elements are connected to flexible strips 65 whose free ends are positioned to be engaged by a contactor plate 66 at the same time that the corresponding strips of the rear brake rheostat are engaged. This plate is mounted on the periphery of an insulating disk 67 carried by the shaft 41 adjacent the disk 57. With this arrangement, current in the front brake magnets may be varied in four steps, being a maximum when the shaft 41 is in No. 4 position and a minimum when the shaft is in No. 1 position.

To enable the vehicle driver to gage the movement of the control knob 42 required to cause engagement of the proper strips 54 and 65 for effecting the desired change in the setting of the auxiliary controller, a detent is provided which is operative when the control shaft is in any one of its four positions to yieldably resist movement of the shaft in either direction. The detent herein employed is in the form of a plunger 68 carried by a leaf spring 69 and urged thereby into apertures 70 formed in the disk 67 and spaced to receive the rounded nose of the plunger when the shaft is in any one of its different positions.

From the foregoing, it will be apparent that the total braking effect produced at any given position of the foot pedal actuator of the main rheostat will be determined by the combined resistance of the then active elements of the front and rear brake rheostats. It is contemplated that these resistance values will be such as to adapt the braking system as a whole to several different driving conditions. For example, the combined resistance of the elements 51 and 61 should be of a value such that the maximum current capable of being delivered to the brake magnets with the pedal 27 fully depressed will produce a braking action approximately sufficient to cause locking of the vehicle wheels when the vehicle is traveling along a slippery road surface such as an icy pavement.

Likewise, the resistance of the magnet circuits, when the auxiliary controller is in No. 4 position with the short-circuiting elements 48 and 61 active, is such that the wheels will approach the point of locking when the foot pedal is fully depressed and the vehicle is traveling on a dry pavement. Such severe braking would be somewhat uncomfortable to the vehicle occupants and therefore would ordinarily be employed only when driving in heavy traffic. For ordinary driving on dry pavements a less severe braking action would be preferred, in which case the control knob 42 would be set in No. 3 position, the elements 49, 50, 51, 61, 62 and 63, which are active at this step, introducing such resistance in the brake circuits as to prevent the maximum obtainable retarding effect from approaching the point of causing skidding of the wheels on dry pavements. The resistances which are active when the controller is in its No. 2 position might be such as to adapt the brakes for most efficient braking on loosely graveled roads or other commonly encountered conditions under which the wheels will be locked by a braking action intermediate that produced at the first and third positions of the supplemental controller.

With the controller thus constructed and located, the vehicle driver always knows the condition of the braking system and can readily gage the changes in the adjustment of the same which are required to adapt the system to new driving conditions as they are encountered. In this way, the brakes may be set conveniently to work at optimum efficiency under the existing condition of the road surface being traveled.

The four different ratios of distribution of the braking between the front and rear wheels, which ratios are automatically varied as an incident to variation in the intensity of total braking, are established by proportioning the values of the active resistance elements in the front and rear brake circuits relative to each other. Thus, when the control knob 42 is in position for maximum braking, the ratio established by the adjustable resistance element 39 is approximately the standard 60—40 ratio. The element 51 is of greater resistance than the element 61 so that when the controller is in No. 1 position, eighty percent of the total current flows through the magnets 21' and therefore the same proportion of the total braking is produced at the front wheels which thereby lessens the danger of side skidding at the rear wheels. By this change, the total braking effect which may be produced on a slippery pavement is substantially increased over that which could safely be applied if the standard 60—40 ratio of distribution were maintained.

In a similar manner the resistance element 50 is so proportioned relative to the resistance of the element 62 that the ratio of distribution between the front and rear wheel brakes will be decreased when the auxiliary controller is moved from its first to its second position in which the elements 50, 51, 61 and 62 are all active. A still further reduction in the ratio is obtained by establishing proper relative values for the elements 49 and 63 which are effective when the controller is in its third position. This latter ratio is, however, somewhat larger than the 60—40 ratio established by the supplemental controller when in its fourth position.

It will be observed that the above arrangement of circuits and resistances affords a simple and reliable control by which the desirable changes in the maximum obtainable braking intensity may be made readily and conveniently during actual operation of the vehicle. It is contemplated that the degree of braking intensity as well as the ratio of distribution are not fixed quantities but may be varied as desired to meet the requirements encountered in the operation of different kinds of vehicles, in different localities, and under different road conditions. Such requirements may be readily fulfilled with an electrical system of the character above described and the settings, when once established, will not vary with the service wear of the braking elements.

I claim as my invention:

1. An electric braking system for an automotive vehicle combining a plurality of friction brakes one for each front and rear wheel of the vehicle including an electromagnet, a primary rheostat controllable by the vehicle driver to apply energizing current to all of said electromagnets and to regulate the intensity of such current, an auxiliary brake control member movable by the vehicle driver into a plurality of predetermined positions, two resistance elements respectively interposed in circuits common to the front and rear brake magnets and acting when said member is in one position to limit the current intensity in the respective magnets, the relative resistances of said elements being proportioned to establish a predetermined ratio of current distribution between the front and rear wheel brakes, and a second pair of resistance elements adapted, upon movement of said member to another of said positions, to be interposed respectively in said front and rear brake circuits and in parallel with the respective first mentioned elements, the resistances of said last mentioned elements being so proportioned as to decrease the proportion of total current distributed to said front brake magnets.

2. An electric braking system for an automotive vehicle combining a plurality of friction brakes one for each front and rear wheel of the vehicle including an electromagnet, a primary rheostat controllable by the vehicle driver to apply energizing current to all of said electromagnets and to regulate the intensity of such current, an auxiliary brake control member movable by the vehicle driver into a plurality of predetermined positions, a pair of short-circuited conductors adapted to be interposed respectively in circuits common to the front and rear brake magnets when said member is in one of said positions, and a pair of resistance elements one adapted to be interposed in said front brake circuit and the other in the rear brake circuit upon movement of said member to another of said positions during which said conductors are rendered ineffectual, the resistances of said elements being so proportioned relative to each other as to increase the proportion of current distributed to the front brake magnets when the elements are active, relative to the proportion distributed thereto when said conductors are active.

3. An electric braking system for an automotive vehicle combining a plurality of friction brakes each associated with one vehicle wheel and including an electromagnet, a primary controller for the circuits of said magnets adapted to apply electric current thereto and to regulate the current intensity to produce varying degrees of braking action, and an auxiliary controller for said circuits operable to vary in predetermined increments the total current applied to the circuits by said primary controller and at the same time to change the ratio of current distribution between the magnets of the front and rear wheel brakes.

4. An electric braking system for an automotive vehicle combining a plurality of friction brakes each associated with one vehicle wheel and including an electromagnet, a primary controller for the circuits of said magnets adapted to apply electric current thereto and to regulate the current intensity to produce varying degrees of braking action, a supplemental control member operable in a comparatively small number of stepping movements, and two rheostats respectively controlling the front and rear wheel brake circuits and operable upon movement of said member in opposite directions to increase and decrease the intensity of current capable of being produced by said primary controller throughout the latter's range of movement.

5. An electric braking system for an automotive vehicle combining a plurality of friction brakes each associated with one vehicle wheel and including an electromagnet, a primary controller for the circuits of said magnets adapted to apply electric current thereto and to regulate the current intensity to produce varying degrees of braking action, and supplemental means operable selectively by the vehicle driver to vary the total resistance of all of said circuits and the relative resistances of the front and rear brake circuits.

6. An electric braking system for an automotive vehicle combining a plurality of friction brakes each associated with one vehicle wheel and including an electromagnet, a primary controller for the circuits of said magnets adapted to apply electric current thereto and to regulate the current intensity to produce varying degrees of braking action, and selectively operable means having a member adapted upon movement in one direction to increase in successive predetermined steps the combined resistance of all of said circuits and to decrease the resistance of the front brake circuits relative to the rear brake circuits.

7. A brake control system for an automotive vehicle having four wheel brakes combining a primary controller for applying all of said brakes and varying the degree of total retarding action, and an auxiliary controller adapted to vary in predetermined increments the intensity of the total braking produced by said primary controller and simultaneously to vary the ratio of distribution of braking action between the front and rear wheel brakes.

8. A brake control system for an automotive vehicle having four wheel brakes combining a primary controller for applying all of said brakes and varying the degree of total retarding action, and an auxiliary controller adapted to decrease the degree of braking action produced by said primary controller and simultaneously to increase the proportion of the braking action occurring at the front vehicle wheels.

9. An electric braking system for an automotive vehicle combining a plurality of friction brakes one for each front and rear wheel of the vehicle including an electromagnet, a primary rheostat controllable by the vehicle driver to apply energizing current to all of said electromagnets and to regulate the intensity of such current, and two rheostats having a common actuator and separate resistance elements interposed respectively in two circuits common to the front and rear brake magnets respectively and acting in the movement of said actuator to vary the ratio of distribution of current between said front and rear brake circuits.

10. An electric braking system for an automotive vehicle combining a plurality of friction brakes one for each front and rear wheel of the vehicle including an electromagnet, a primary rheostat controllable by the vehicle driver to apply energizing current to all of said electromagnets and to regulate the intensity of such current, and two rheostats having a common actuator and resistance elements operable in the movement of said actuator to change the proportion of the total current applied to said front brake magnets for any given position of said primary controller.

11. An electric braking system for an automotive vehicle combining a plurality of brakes each associated with one vehicle wheel and having an electromagnet adapted when energized to produce a retarding effect on the wheel proportional to the intensity of the energizing current, a primary rheostat common to all of said magnets and movable in one direction to apply current thereto and to increase progressively the current intensity, an auxiliary controller comprising an actuating member movable into a plurality of predetermined set positions, a resistance element permanently included in the circuits for said magnets and acting, when said member is in one limiting position, to limit to a predetermined value the intensity of current applied thereto by said primary controller, and a plurality of resistance elements adapted to be interposed in parallel with said first mentioned element successively in the movement of said member away from said limiting position whereby to increase in predetermined steps the intensity of current capable of being produced in said magnets by said primary controller.

12. An electric braking system for an automotive vehicle combining a plurality of brakes each associated with one vehicle wheel and having an electromagnet adapted when energized to produce a retarding effect on the wheel proportional to the intensity of the energizing current, a primary rheostat common to all of said magnets and movable in one direction to apply current thereto and to increase progressively the current intensity, an auxiliary controller having an actuating member movable by the vehicle driver into a plurality of predetermined positions, a resistance element interposed in series with said electromagnets and acting when said member is in one of said positions to limit the intensity of current applied to the magnets for any given position of the rheostat, and a short-circuiting conductor adapted to be interposed in series with said electromagnets when said member is in another of said positions.

13. An electric braking system for an automotive vehicle combining a plurality of brakes each associated with one vehicle wheel and having an electromagnet adapted when energized to produce a retarding effect on the wheel proportional to the intensity of the energizing current, a primary rheostat common to all of said magnets and movable in one direction to apply current thereto and to increase progressively the current intensity, an auxiliary controller having an actuating member movable by the vehicle driver into a plurality of predetermined positions, a resistance element interposed in series with said electromagnets and acting when said member is in one of said positions to limit the intensity of current applied to the magnets for any given position of the rheostat, and a plurality of resistance elements adapted to be interposed in parallel with said first mentioned element successively in the movement of said member into its different positions.

14. An electric braking system for an automotive vehicle combining a plurality of friction brakes one for each of a plurality of the vehicle wheels including an electromagnet adapted when energized to produce a retarding effect at the wheel proportional to the intensity of the energizing current, a primary brake control means including a rheostat common to all of said electromagnets and adapted to apply energizing current thereto and to produce progressive changes in the intensity of said current throughout the range of movement of the rheostat actuator, and an auxiliary rheostat also common to said brake circuits and operable to increase or decrease in a comparatively small number of increments the intensity of current applied to each of said electromagnets for any given position of said primary rheostat actuator, said auxiliary rheostat having an actuator visible to and within the reach of the vehicle driver to enable the latter to gage the setting of the auxiliary rheostat.

15. An electric braking system for an automotive vehicle combining a plurality of friction brakes one for each of a plurality of the vehicle wheels including an electromagnet adapted when energized to produce a retarding effect at the wheel proportional to the intensity of the energizing current, a primary brake control means including a rheostat common to all of said electromagnets and adapted to apply energizing current thereto and to produce progressive changes in the intensity of said current throughout the range of movement of the rheostat actuator, a supplemental rheostat constantly closing all of said circuits and having an actuating member movable in opposite directions into a comparatively small number of predetermined positions to increase and decrease the intensity of current applied to the magnet circuits for any given position of said primary controller, and means associated with said member and acting yieldably to maintain the member in one of said predetermined positions thereby enabling the driver to gage the setting of said member.

In testimony whereof, I have hereunto affixed my signature.

JOHN WHYTE.